US010728599B2

(12) United States Patent
Arunkumar et al.

(10) Patent No.: US 10,728,599 B2
(45) Date of Patent: Jul. 28, 2020

(54) GATEWAY SERVER CONDITIONED MEDIA STREAMING

(71) Applicant: ARRIS ENTERPRISES, LLC, Suwanee, GA (US)

(72) Inventors: Lakshmi Arunkumar, Bangalore (IN); Krishna Prasad Panje, Bangalore (IN); William P. Franks, San Diego, CA (US)

(73) Assignee: ARRIS ENTERPRISE, LLC, Suwanee, GA (US)

( * ) Notice: Subject to any disclaimer, the term of this patent is extended or adjusted under 35 U.S.C. 154(b) by 0 days.

(21) Appl. No.: 14/568,987

(22) Filed: Dec. 12, 2014

(65) Prior Publication Data
US 2016/0173552 A1 Jun. 16, 2016

(51) Int. Cl.
G06F 15/16 (2006.01)
H04N 21/258 (2011.01)
H04L 29/06 (2006.01)
H04L 29/08 (2006.01)

(52) U.S. Cl.
CPC ... *H04N 21/25833* (2013.01); *H04L 65/4084* (2013.01); *H04L 65/605* (2013.01); *H04L 67/2823* (2013.01); *H04N 21/25825* (2013.01)

(58) Field of Classification Search
None
See application file for complete search history.

(56) References Cited

U.S. PATENT DOCUMENTS

| 6,154,772 | A | * | 11/2000 | Dunn | H04M 11/062 725/114 |
| 8,321,212 | B2 | | 11/2012 | Kim | |
| 2002/0123879 | A1 | | 9/2002 | Spector | |
| 2003/0014531 | A1 | * | 1/2003 | Bodin | H04L 29/06 709/231 |
| 2005/0203927 | A1 | * | 9/2005 | Sull | G11B 27/034 |
| 2007/0171903 | A1 | * | 7/2007 | Zeng | H04L 29/06027 370/389 |
| 2007/0186003 | A1 | * | 8/2007 | Foster | H04L 29/06027 709/231 |
| 2009/0177794 | A1 | * | 7/2009 | Alexander | G06F 17/30029 709/237 |
| 2009/0313674 | A1 | * | 12/2009 | Ludvig | H04N 21/4263 725/118 |

(Continued)

*Primary Examiner* — Phyllis A Book
(74) *Attorney, Agent, or Firm* — Buchanan Ingersoll & Rooney PC

(57) ABSTRACT

Modern audio and video content typically provides multiple programming, such as multiple alternate video versions, multiple language options, and possibly also closed captioning or subtitles in multiple languages. Gateway conditioned media streaming provides systems and methods for conditioning multimedia content according to the preferences of a recipient client device, such that the device receives the preferred video, audio, and/or closed captioning automatically and regardless of the application used to play the content. When a gateway server receives a request for content, the gateway server identifies the requesting client device from recorded information, and uses the recorded preferences to modify the content stream according to those preferences. The modified content stream is then sent to the requesting client device.

8 Claims, 7 Drawing Sheets

(56) References Cited

U.S. PATENT DOCUMENTS

| | | | |
|---|---|---|---|
| 2010/0020794 A1* | 1/2010 | Cholas | H04N 7/17318 370/389 |
| 2010/0306402 A1* | 12/2010 | Russell | A63F 13/12 709/231 |
| 2011/0116419 A1* | 5/2011 | Cholas | H04L 65/1006 370/259 |
| 2011/0252118 A1* | 10/2011 | Pantos | G06F 17/30053 709/219 |
| 2012/0013746 A1* | 1/2012 | Chen | G11B 27/034 348/180 |
| 2012/0150991 A1* | 6/2012 | Krueger | H04N 21/242 709/217 |
| 2013/0166580 A1* | 6/2013 | Maharajh | H04L 65/605 707/758 |
| 2014/0068789 A1* | 3/2014 | Watts | H04W 12/08 726/29 |
| 2014/0109132 A1* | 4/2014 | Hasek | H04N 7/17318 725/32 |
| 2014/0195675 A1* | 7/2014 | Silver | H04L 65/1083 709/224 |
| 2014/0359152 A1* | 12/2014 | Heng | H04L 65/4084 709/231 |

* cited by examiner

GATEWAY SERVER CONDITIONED MEDIA STREAMING

BACKGROUND

The present disclosure relates generally to delivering multimedia content to client devices and more specifically to conditioning multimedia content according the audio, video, and closed caption preferences of the specific client device.

Present Federal Communications Commission (FCC) regulations require high definition set-top boxes provided by cable operators to comply with an open industry standard that provides for audiovisual communications including service discovery, video transport, and remote control command pass-through standards for home networking. Client devices that support an open standard interface may thus be able to request media content, such as for instance live broadcast audio and/or video or recorded content, from the set-top box. As a result, the volume of content provided by the set-top box will increase.

Set-top boxes can provide additional services to meet this demand. In addition to implementing an open standard to provide discovery, video transport, and remote control command pass-through, a set-top box can provide a reasonable description of available content. Additionally, the set-top box can store client-specific preference and condition multimedia content according to those preferences.

SUMMARY

In various embodiments, an apparatus for delivering multimedia content is provided. The apparatus comprises a processor and a memory coupled to the processor, wherein the memory stores program instructions. When executed from the memory, the program causes the processor to register one or more client devices, comprising recording a unique identification and multimedia preferences for each device. The program instructions further cause the processor to receive a request for a content stream from a client device, the content stream comprising one or more media streams. The program instructions further cause the processor to identify the requesting client device as a registered client device. The program instructions further cause the processor to modify the requested content stream according to the multimedia preferences for the requesting client device and send the modified content stream to the requesting client device.

In various embodiments, a computer-implemented method for delivering multimedia content is provided. The computer-implemented method comprises registering one or more client devices, comprising recording a unique identification and multimedia preferences for each device. The computer-implemented method further comprises receiving a request for a content stream from a client device, the content stream comprising one or more media streams. The computer-implemented method further comprises identifying the requesting client device as a registered client device. The computer-implemented method further comprises modifying the requested content stream according to the multimedia preferences for the requesting client device and sending the modified content stream to the requesting client device.

In various embodiments, a computer-implemented method for delivering multimedia content is provided. The computer-implemented method comprises receiving a request for a content stream from a client device, the content stream comprising one or more media streams. The computer-implemented method further comprises identifying a language preference for the requesting client device and sending a content stream comprising the preferred language.

FIGURES

The embodiments may be better understood by reference to the following description, taken in conjunction with the accompanying drawings as follows.

DETAILED DESCRIPTION

Modern audio and video content typically provides multiple programming, such as for instance multiple alternate video versions, multiple language options, and possibly also closed captioning or subtitles in multiple languages. Such multimedia content may be viewed on any number of devices, such as smart phones, tablet computers, laptops, televisions, etc., collectively called client devices herein. Not all client devices, however, are capable of identifying the different audio and video programs; these devices will play only what has been identified as the default audio and/or video program. Some client devices are capable of identifying multiple audio and video programs, but do not provide the user with a means of selecting a video program or language. Other client devices do offer the option to select, for example, a director's cut provided with the content or an alternate language, but the user typically must select his or her desired options for each content viewed, every time the content is viewed, and with every application used to view the content. The user experience can be improved by providing a system that remembers the video, audio, and/or closed caption preferences for a client device and provides the preferred video, audio, and/or closed captioning in an automated fashion.

Figure 1:
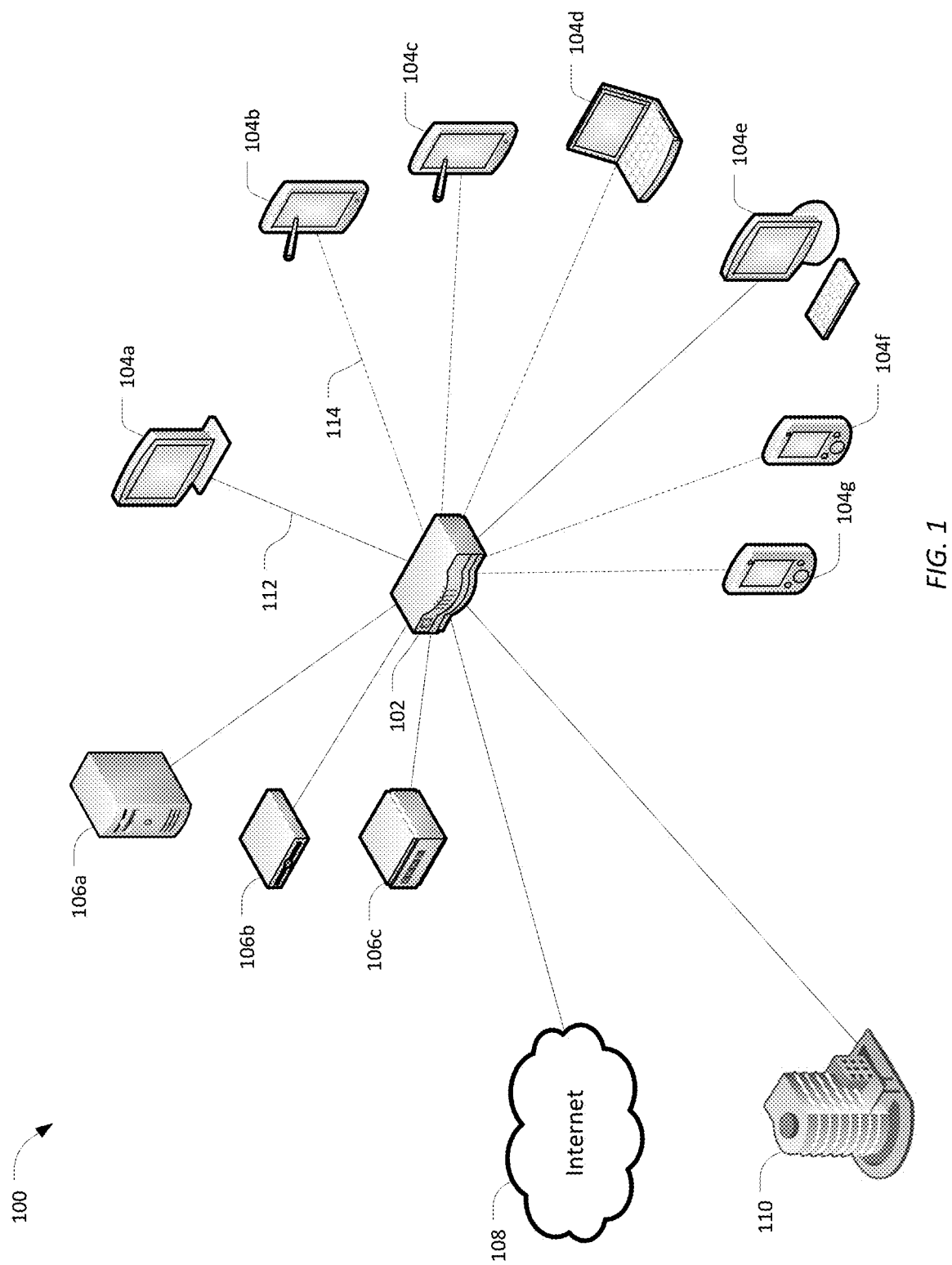
FIG. 1 illustrates one embodiment of a gateway server system for delivering multimedia content to one or more client devices.

FIG. 1 illustrates one embodiment of a gateway server system 100 for delivering multimedia content to one or more client devices 104. The gateway server system 100 comprises a gateway server 102 and one or more client devices 104, and may further comprise one or more media playback devices 106, a network connection to the Internet 108, and/or a connection to a cable service provider 110. The gateway server 102 provides multimedia content to the client devices 104. The gateway server 102 may comprise, for example, a set top box located within the home. Alternatively, the gateway server 102 may be located in a location remote to the home.

Client devices 104 comprise electronic devices capable of audio and/or video playback. Such devices include, for example, televisions 104a, tablet computers 104b, 104c, laptop computers 104d, desktop computers 104e, and smart phones 104f, 104g, among others. The gateway server 102 may provide data to the client devices 104 by wired 112 or wireless 114 connections. Wired 112 connections may be provided by, for example, coaxial cable, fiber optic cable, Category 5 network cable, telephone cable, and any other cable capable of transmitting data. Wireless 114 connections may be provided by various WiFi, WiMAX, UltraWideband, Bluetooth™ and other wireless standards, for example.

The gateway server system 100 may also include one or more media playback devices 106. Media playback devices 106 comprise electronic devices capable of playing recorded audio and/or video media, and/or streaming media from a remote location, and/or generating interactive media, such as video games. Such media playback devices include, for example, content servers 106a, CD/DVD/Blue-Ray™ players 106b, and gaming devices 106c, among others.

The gateway server system 100 may also include a network connection to the Internet 108. The gateway server 102 may use the network connection to the Internet 108 to provide content to the client devices 104 from remote locations. Such remote locations may include, for example: audio streaming services such as Pandora™, Spotify™, Apple iTunes™, and the like; video streaming services such as YouTube™, Netflix™, Amazon Video™, and the like; and websites that provide audio and/or video streaming, among others.

The gateway server system 100 may also included a connection to a cable service provider 110. Cable service providers provide broadcast audio and/or video, on-demand audio and/or video, pay-per-view video, and video rental, among other services. The services provided by a cable operator may also be provided by non-wired systems, such as satellite broadcast systems.

The gateway server 102 delivers multimedia content to one or more client devices 104. Multimedia content comprises audio, such as radio, music, or audio plays, among others; video; or audio and video, such as television programs or movies, among others. Multimedia content may also comprised closed captioning or subtitles, for client devices that support closed captioning or subtitles.

Figure 2:
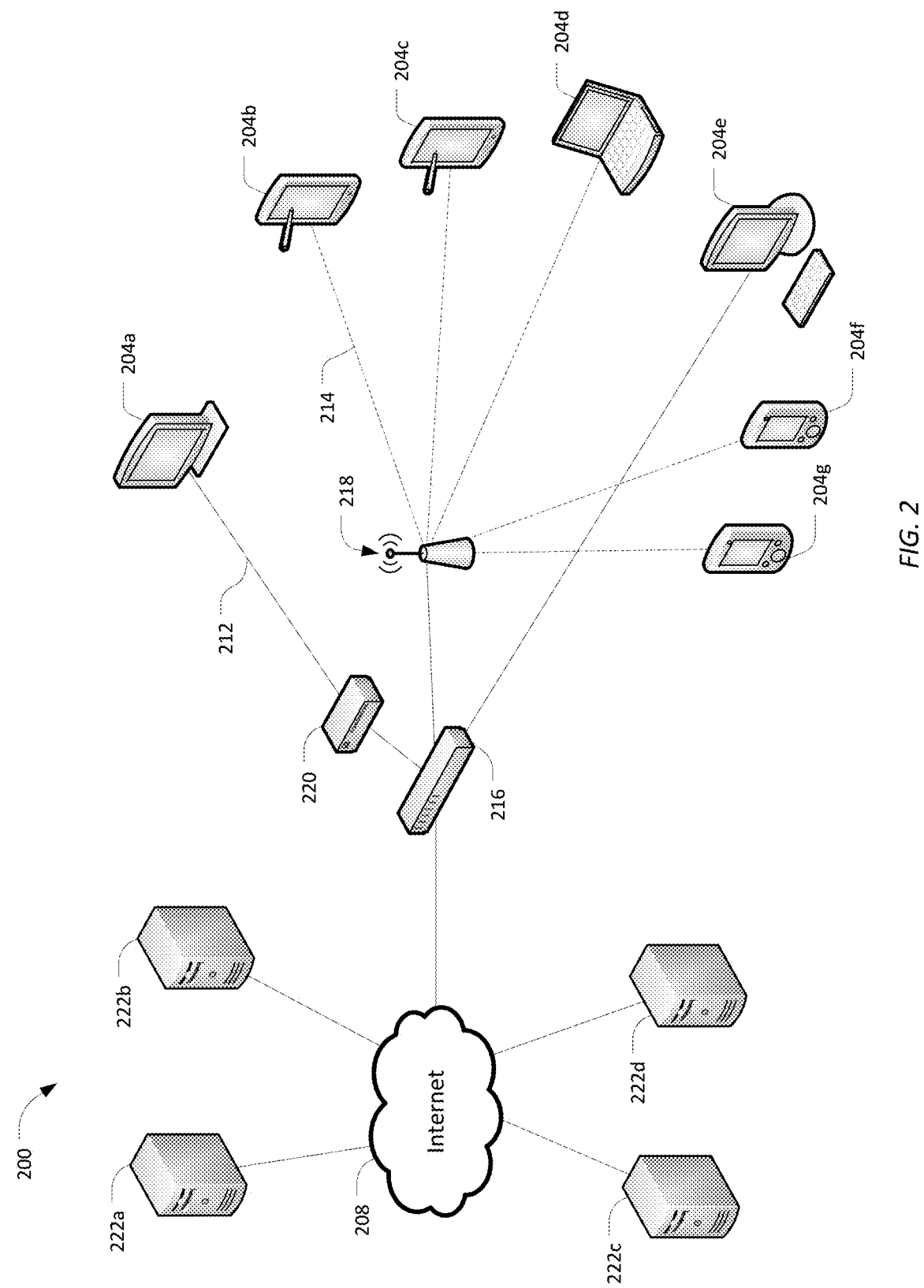
FIG. 2 illustrates one embodiment of a network content distribution system for delivering content to one or more client device.

FIG. 2 illustrates one embodiment of a network content distribution system 200 for delivering content to one or more client devices 204. The network content distribution system 200 describes one method for delivering Internet 208 or remote multimedia content over a network to client devices 204 located at the home, or located wherever the client devices 204 have access to a network connection. The network content distribution system 200 may comprise a modem 216, a wireless access point 218, and one or more client devices 204, and may also comprise a media distribution device 220. The modem 216 provides a communications link to the Internet 208 by way of an Internet Service Provider (ISP). The modem 216 may communicate with the ISP over standard interfaces, such as DSL or coaxial cable, using standard protocols. Some client devices 204e may communicate directly with the modem over a wired 212 connection, or by way of a router or hub (not shown). The wireless access point 218 provides wireless 214 communication between client devices 204 and the modem 216. The wireless access point 218 may employ any of the wireless protocols described above. Client devices comprise electronic devices capable of audio and/or video display such as, for example, televisions 204a, tablet computers 204b, 204c, laptop computers 204d, desktop computers 204e, and smart phones 204f, 204g, among others A media distribution device 220 provides an alternate or additional system for delivering multimedia content to client devices 204. The media distribution device 220 may comprise, for example, a home theatre receiver, a gaming device, or a general purpose computer, among others. The media distribution device 220 may provide wired 212 communications to devices, such as televisions 204a, are not configured for wireless communication.

The network content distribution system 200 provides a method of delivering Internet 208 or remote multimedia content over a network to client devices 204. The multimedia content is provided by one or more content servers 222. The content servers 222 provide multimedia content over the Internet 208 to client devices 204 capable of communicating with the Internet 208. Content providers include, for example: audio streaming services such as Pandora™, Spotify™, Apple iTunes™, and the like; video streaming services such as YouTube™, Netflix™, Amazon Video™, and the like; and websites that provide audio and/or video streaming, among others.

Multimedia content is typically encoded and/or compressed before transmission, usually to reduce the number of bits that must be transmitted, among other reasons. Upon receipt, the content stream is then uncompressed and/or decoded before it is played. Typically, the content stream includes information about what is contained within the content stream.

Figure 3:
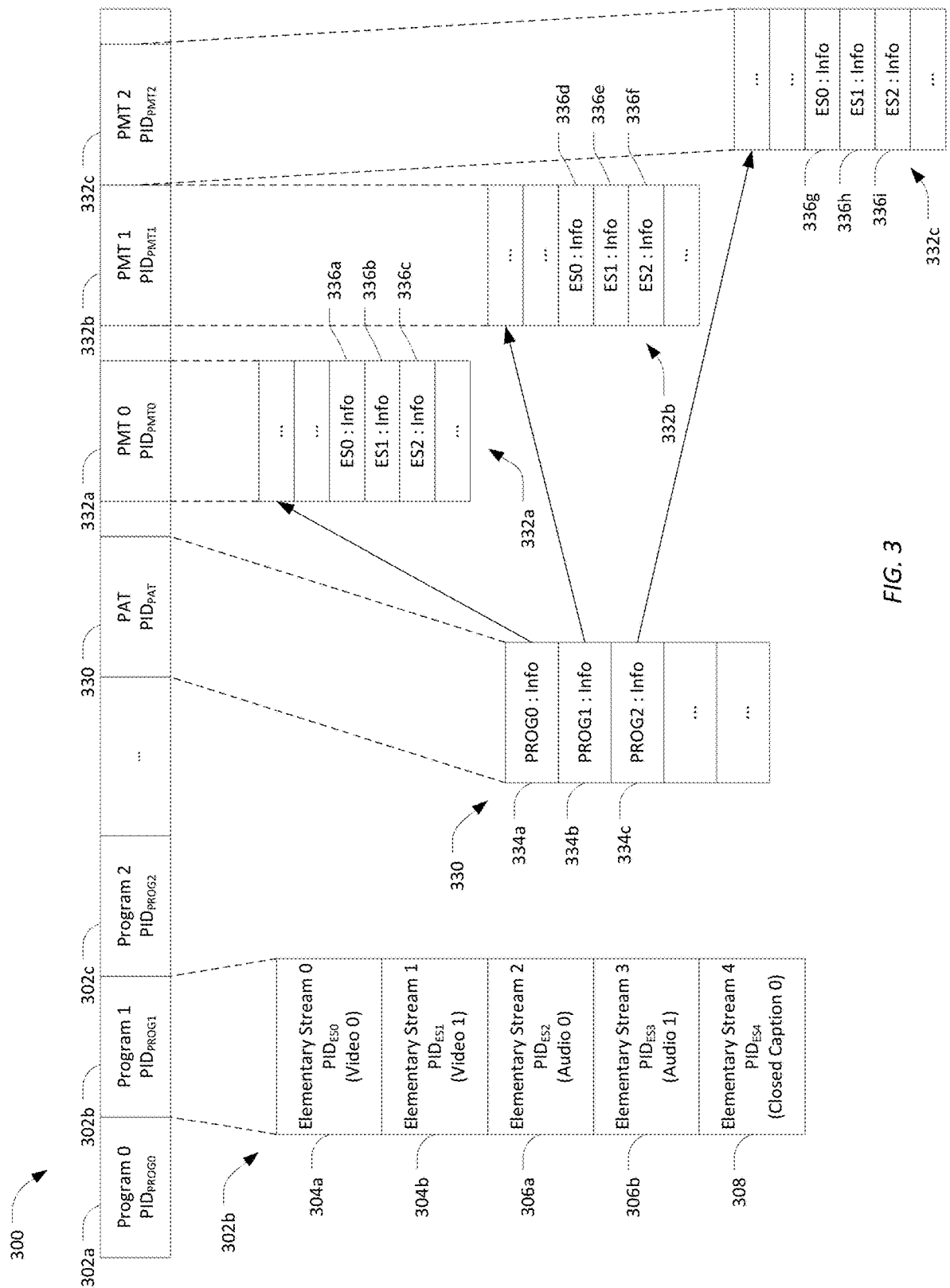
FIG. 3 illustrates one example of a Multi-Program Transport Stream (MPTS) for delivering multiple programs to client device.

FIG. 3 illustrates one example of a Multi-Program Transport Stream (MPTS) for delivering multiple programs to client devices. Single Program Transport Streams (SPTS) are also possible, and function in a similar manner. The illustrated MPTS may be implemented by any number of standards, such as for instance the MPEG standard, among others, for example.

The MPTS content stream 300 comprises one or more programs 302. A program 302 comprises one stream of content, such as for instance a single television channel. The single content stream 300 may thus provide multiple television channels. Programs 302 may be divided into pieces, and the pieces of multiple programs 302 may be multiplexed within the content stream 300. Each program 302 includes a packet ID (PID) to identify packets that belong to the same program.

A program 302 may contain one or more elementary streams. FIG. 3 illustrates as an example an expanded view of Program 1 302b from the content stream 300. As illustrated, Program 1 302b contains two video streams 304, two audio streams 306, and one closed caption stream 308. A program 302 can contain any number of video, audio, closed caption, and other types of streams, or may omit one or more types of these streams, and the pieces of the streams may be multiplexed within the program 302b in any order. Multiple video streams 304 in a program 302b provide multiple views of the same program 302b, such as for instance a director's cut or special camera angle. Multiple audio streams 306 provide different languages for the program 302b, or special audio, such as a running commentary. Closed caption 308 streams may also be provided in different languages.

The content stream 300 may also comprise a table 330 that identifies the programs 302 contained in the content stream 300. In MPEG transport streams this table 330 is called a Program Association Table (PAT). The PAT 330 is delivered within the content stream 300 and has a unique PID to identify it within the content stream 300. The PAT 330 or an equivalent table typically lists each program 302 in the content stream 300, and may contain other information about the content stream 300. The table entries 334 in the PAT 330 include information about the programs 302. This information may include a pointer to a table with specific information specific to the program. In MPEG transport streams the table entries 334 include the PID of the Program Map Table (PMT) for the program.

The PMT 332 or an equivalent table contains information about a single program 302. In an implementation such as MPEG, each program 302 has a PMT 332. The PMTs 332 are delivered by the content stream 300 and each has a unique PID to identify it within the content stream. Typically, a PMT 332 or equivalent table for a program 302 lists each elementary stream in the program 302, and may contain additional information about the program 302. Each PMT entry 336 may contain additional information about the elementary stream.

As illustrated by the content stream 300 of FIG. 3, users of client devices may be able to view and listen to alternate versions of a program. For example, the user may wish to listen to a Spanish translation of a movie originally recorded in English. The user's options, however, may be limited by the client devices. Some client devices are not able to identify multiple elementary streams within the program. Such devices will playback what has been identified as the default version of the video, audio, and, if enabled, closed captioning. Typically, the default video, audio, and closed caption is the first elementary stream of its type listed n the PMT for the program. Typically, the language for the audio and closed captioning of the first-listed elementary streams is the language in which the media was recorded. The first-listed video elementary stream may typically be the preferred video of the content producer.

Some client devices do recognize multiple elementary streams within a program, but do not allow the user to choose between multiple video, audio, and closed captioning options. Other devices do allow the user to choose, but typically require the user to make these selections every time the content is viewed and/or listened to. Language and video settings may also be specific to the application used to view and/or listen to the content; hence, for every application the user uses to play multimedia content, he or she may have to select his or her preferred audio and video settings.

In various embodiments, gateway conditioned media streaming provides systems and methods for conditioning multimedia content according to the preferences of a recipient client device, such that the device receives the preferred video, audio, and/or closed captioning automatically and regardless of the application used to play the content.

In one embodiment, a process may be executed by a gateway server. The process registers one or more client devices, recording the audio, video, and/or closed caption preferences of the client device, along with a unique identifier for the client device. When the gateway server receives a request for content, the gateway server identifies the requesting client device from recorded information, and uses the recorded preferences to modify the content stream according to those preferences. The modified content stream is then sent to the requesting client device.

In another embodiment, a process may include transcoding content from one format to another. Such a process may be executed by a gateway server. The process registers one or more client devices, recording the audio, video, and/or closed caption preferences of the client device, along with a unique identifier for the client device. When the gateway server receives a request for content, the gateway server identifies the requesting client device from recorded information. The gateway server transcodes the content, and may generate a PAT to describe the content, as necessary. The gateway server may also generate PMTs according to the recorded preferences. The transcoded content, with its PAT and PMTs, are sent to the requesting client device.

In one more embodiment, a process may be executed by a content server. The content server may receive a request for content over the Internet. The request may include a language preference for the requesting client device. The content server may use the language preference to determine to the content to send to the requesting client device.

Certain embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present disclosure.

Figure 4:
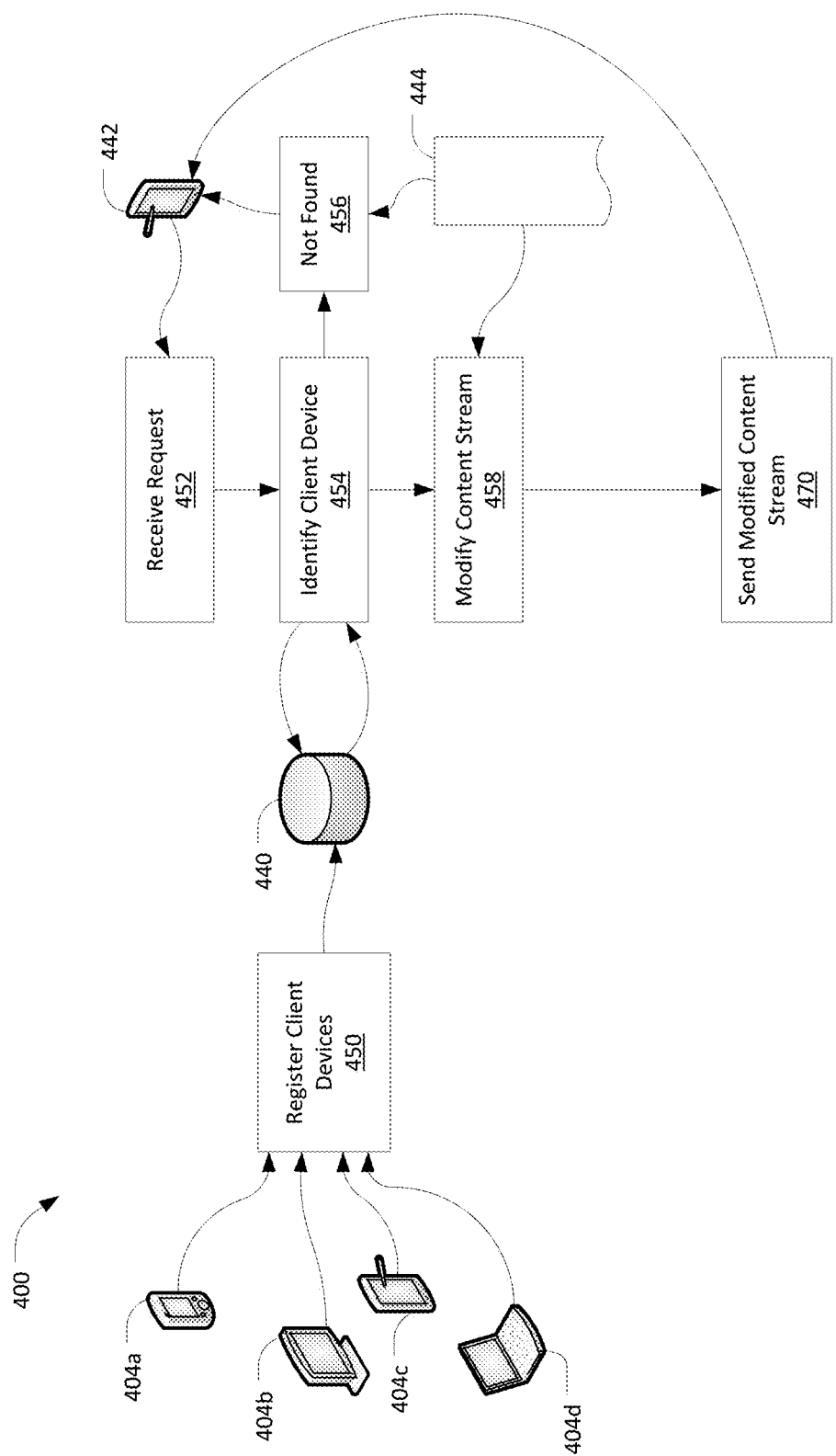
FIG. 4 illustrates one embodiment of a process for conditioning multimedia content according to the preferences of a client device.

FIG. 4 illustrates one embodiment of a process 400 for conditioning multimedia content according to the preferences of a client device. The process 400 may be executed by a gateway server, such as for instance the gateway server 102 of FIG. 1. As illustrated in FIG. 4, the process 400 comprises registering 450 one or more client devices 404. Registering 450 a client device 404 comprises recording information about the client device 404, such as for instance the video, audio, and/or closed captioning preferences of the user of the client device 404. The client device 404 may also be assigned a unique identifier, which is also recorded. Additional information about the client device 404 may also be recorded. Example records for various client devices 404 are as follows:

Client Device: Tablet
Unique Name: Lakshmi IPAD
Video: Main Video
Audio: Spanish
Closed Caption: English
Client Device: Tablet
Unique Name: KP IPAD
Video: Video 2

Audio: French
Closed Caption: French
Client Device: Smart Phone
Unique Name: Lakshmi Phone
Audio: Spanish
Closed Caption: English The client device information may be recorded on a storage device 440. The storage device may be local to the gateway server, or may be in a remote location accessible to the gateway server.

The process 400 for conditioning multimedia content continues when a request for content 444 is received 452 from a client device 442. In some embodiments, the gateway server may recognize that the requesting client device 442 is able to interpret the transport stream and is capable of recognizing a user's video, audio, and/or closed captioning preferences. In such embodiments, the gateway server may send the requested content 444 without implementing the remainder of the process 400.

The gateway server accesses the client device records on the storage device 440 to identify 454 the requesting client device 442. When the requesting client device 442 is not found 456 in the client device records, the requesting client device 442 is sent the requested content 444 without any modifications to the content 444. When the requesting client device 442 is found in the client device records, the content 444 is modified 458—that is, the content 444 is conditioned—according to the recorded preferences of the requesting client device 442. Alternatively, in some embodiments the gateway server may recognize that the requesting client device 442 has default video, audio, and/or closed captioning preferences or has sent such preferences with its request. In such embodiments the gateway server may be configured use the default or requested preferences, instead of the recorded preferences, to modify 458 the content 444. The modified content is sent 470 to the requesting client device 442.

Figure 5:
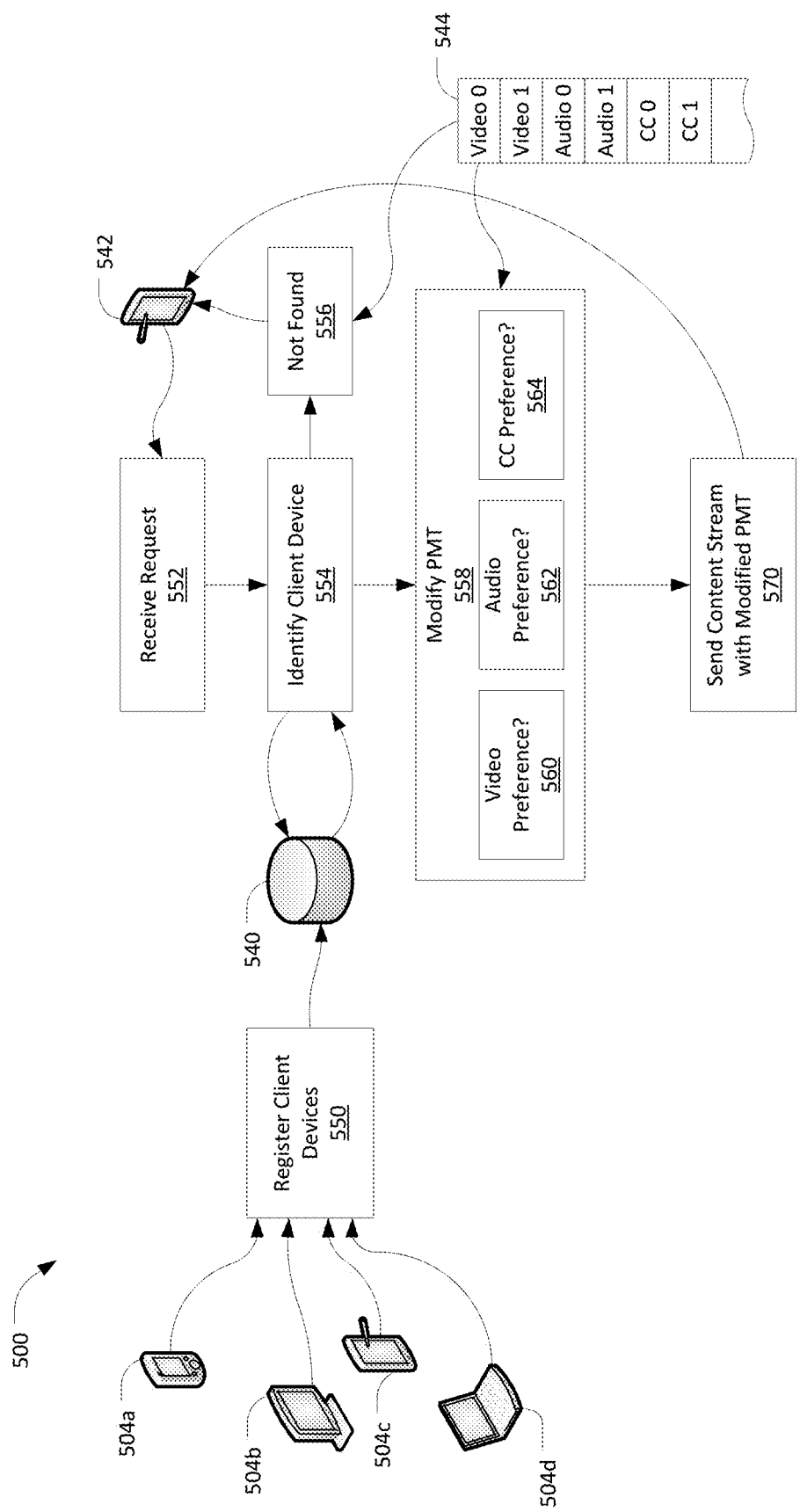
FIG. 5 illustrates one embodiment of a process for conditioning multimedia content according to the preferences of a client device, as applied to the transport stream illustrated in FIG. 3.

FIG. 5 illustrates one embodiment of a process 500 for conditioning multimedia content according to the preferences of a client device, as applied to the transport stream illustrated in FIG. 3, by way of example. The process 500 of FIG. 5 may be executed by a gateway server, such as for instance the gateway server 102 of FIG. 1. As illustrated in FIG. 5, the process 500 comprises registering 550 one or more client devices 504. Registering 550 a client device 504 comprises recording information about the client device 504, such as for instance the video, audio, and/or closed captioning preferences of the user of the client device 504, and assigning the client device 504 a unique identifier. The client device information may be recorded on a storage device 540 that is local or remote to the gateway server.

The process 500 for conditioning multimedia content continues when a request for content 544 is received 552 from a client device 542. The gateway server accesses the client device records on the storage device 540 to identify 554 the requesting client device 542. When the requesting client device 542 is not found 556 in the client device records, the requesting client device 542 is sent the requested content 544 without any modifications to the content 544.

When the requesting client device 542 is found in the client device records, the process 500 proceeds to modify 558 the PMT for the requested program. As discussed above, each program in a transport stream includes a PMT, where the PMT lists the elementary streams that comprise the program. Typically, client devices will play the first video, audio, and/or closed captioning stream listed in the PMT. Modifying 558 the PMT thus involves reordering the entries in the PMT to place the entry for the requesting client device's 542 preferred video, audio, and/or closed caption ahead of any other entries for streams of the same type. For example, the illustrated example content 544 comprises two video streams, two audio streams, and two closed caption streams. A client device that receives this content may automatically select the first video (Video 0), first audio (Audio 0), and first closed captioning (CC0), if closed captioning is enabled, listed in the PMT for the content 544. The requesting client device 542, however, may have recorded no video preference 560, a language preference 562 for Spanish (i.e. Audio 1), and a closed captioning preference 564 for English (CC0). The modify 558 process will thus produce a PMT that lists Video 0 before Video 1, Audio 1 before Audio 0, and CC0 before CC1.

Alternatively, in some embodiments the gateway server may recognize that the requesting client device 542 has default video, audio, and/or closed captioning preferences or has sent such preferences with its request. In such embodiments the gateway server may be configured to use the default or requested preferences, instead of the recorded preferences, to modify 558 the PMT. The modified content is sent 570 to the requesting client device 542.

The process 500 can also be configured for sending the same content 544 to multiple requesting client devices 542. Two or more client devices 542 may request the same content 544 but have different video, audio, and/or closed captioning preferences. In such cases, the gateway server can generate a PMT for each requesting client device. The gateway server will send the same content, with different PMTs, to each requesting client device.

In some cases, a client device may request content in a different format than the format in which the content is available. For example, the content may be encoded in MPEG2 format, while the client device has requested MPEG4 format. In such cases, the gateway server may transcode the content before or while it sends the content to the requesting client device.

Figure 6:
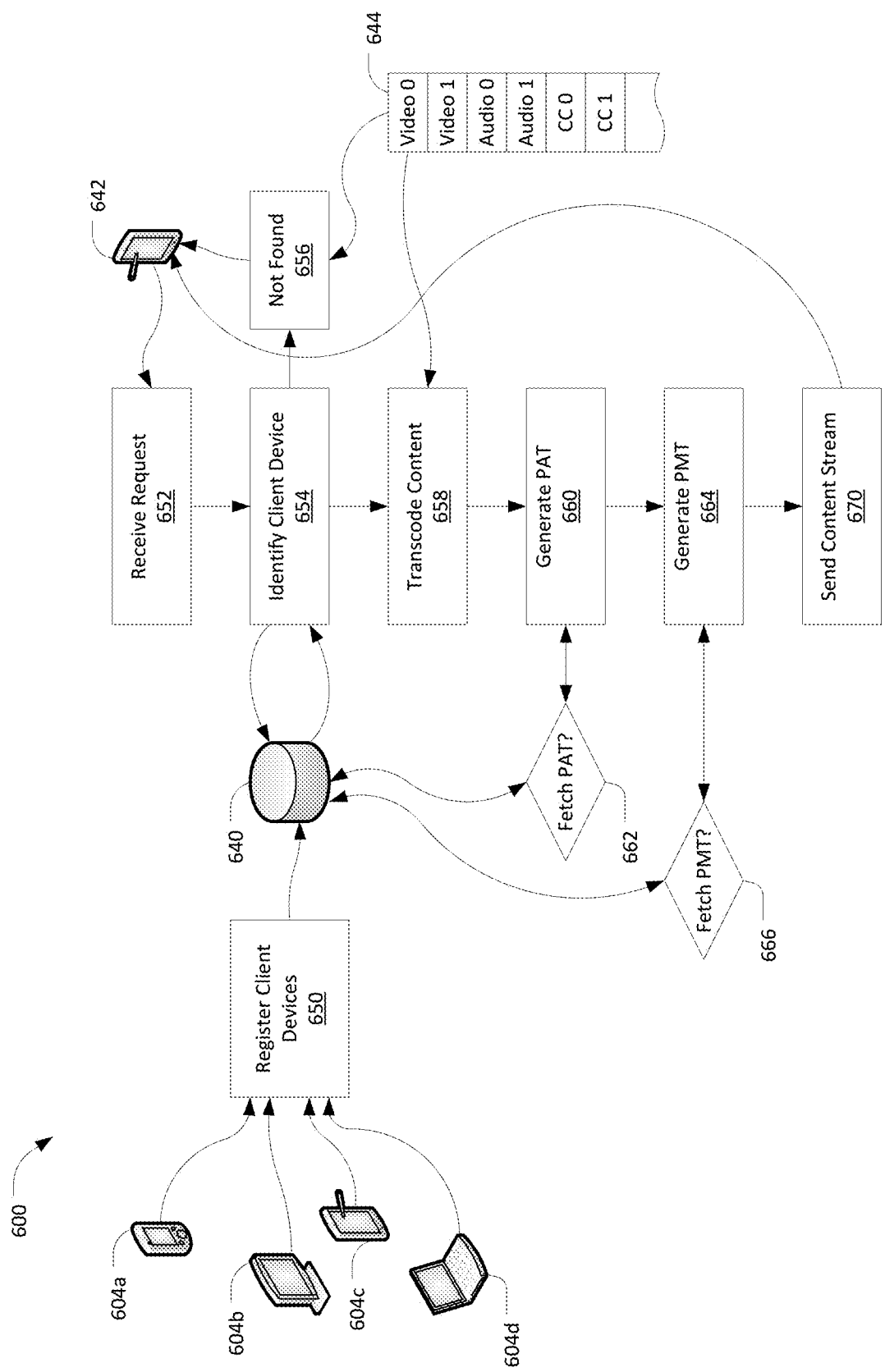
FIG. 6 illustrates one embodiment of a process for conditioning multimedia content when the content is transcoded.

FIG. 6 illustrates one embodiment of a process 600 for conditioning multimedia content when the content is transcoded. The process 600 is described as applied to the transport stream of FIG. 3 by way of example and not limitation. The process 600 of FIG. 6 may be executed by a gateway server, such as for instance the gateway server 102 of FIG. 1. As illustrated in FIG. 6, the process 600 comprises registering 650 one or more client devices 604. Registering 650 a client device 604 comprises recording information about the client device 604, such as for instance the video, audio, and/or closed captioning preferences of the user of the client device 604, and assigning the client device 604 a unique identification. The client device information may be recorded on a storage device 640 that is local or remote to the gateway server.

The process 600 for conditioning multimedia content continues when a request for content 644 is received 652 from a client device 642. The gateway server accesses the client device records on the storage device 640 to identify 654 the requesting client device 642. When the requesting client device 642 is not found 656 in the client device records, the content 644 is transcoded and sent tot the requesting client device 542 without any further processing. When the requesting client device 642 is found in the client device records, the content is transcoded 658 and then a PAT may be generated 660, as necessary transport streams with multiple programs. As discussed above, the PAT describes the programs available in a transport stream. In some embodiments, the gateway server may generate a PAT that is specific to a registered client device 604, and store that PAT for later use. In such embodiments, the generate 660 step may check if a PAT exists for the requesting client device 642 and fetch 662 the stored PAT.

The process 600 may also generate 664 a PMT for each program within the content 644. The PMT will be generated 664 according to the preferences of the requesting client device 642. The preferences may be retrieved from recorded information on the storage device 640 or may be indicated by the requesting device 642 at the time of the request. In some embodiments, the gateway server may generate a PMT that is specific to a registered client device 604, and store that PMT for later use. In such embodiments, the generate 664 step may check if a PMT exists for the requesting client device 642 and fetch 666 the stored PMT.

The transcoded content stream, along with the generated 660 (or fetched 662) PAT and one ore more generated 664 (or fetched 666) PMTs are sent 670 to the requesting client device 642.

In some cases, multimedia content is delivered over a network that does not include a gateway server. Such a case is illustrated by FIG. 2, as described above. Such a content delivery system may require use of a different process than those described above.

Figure 7:
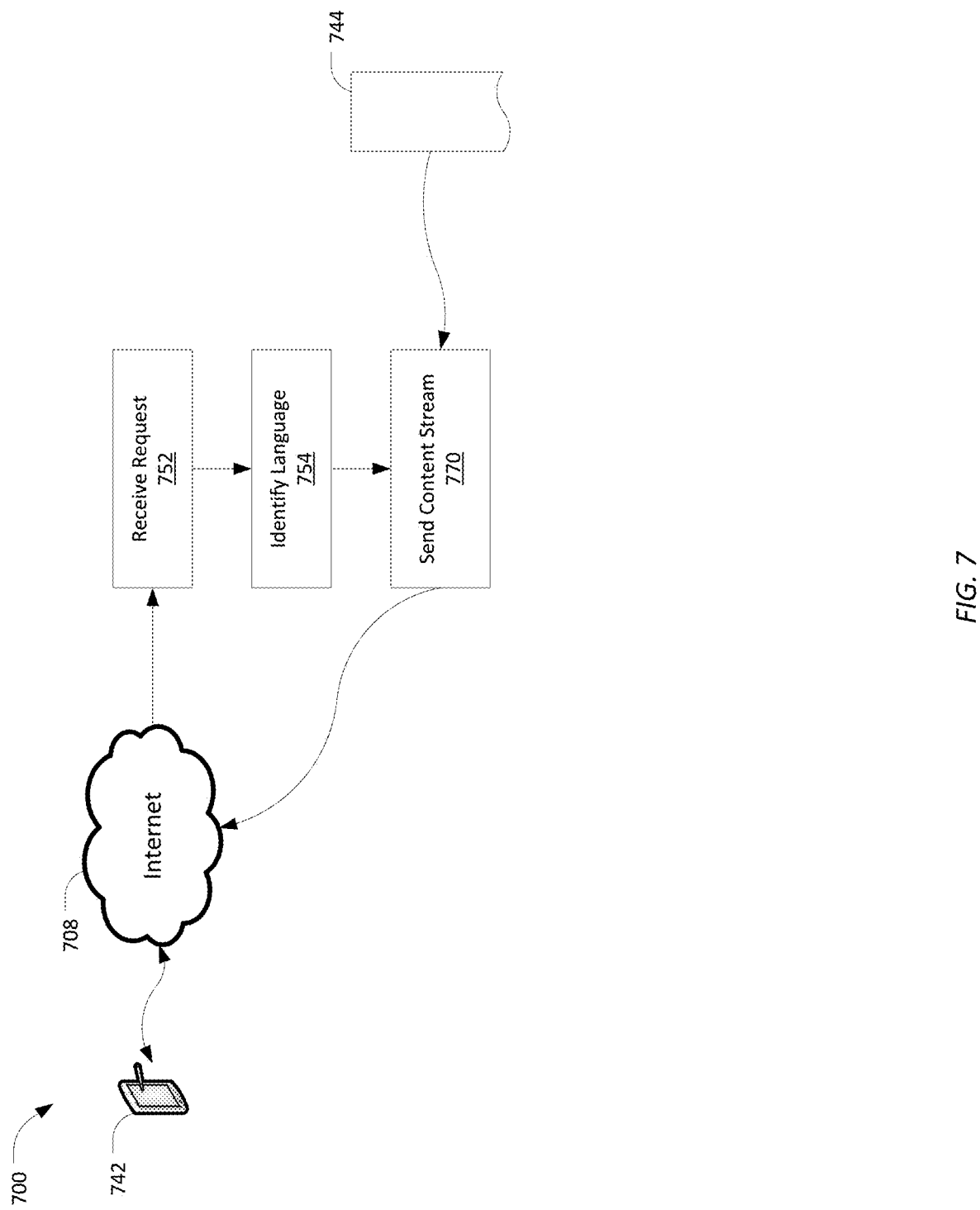
FIG. 7 illustrates one embodiment of a process for delivering conditioned multimedia content according to the preferences of a client device when the content is delivered over the Internet from a remote location.

FIG. 7 illustrates one embodiment of a process 700 for delivering conditioned multimedia content according to the preferences of a client device when the content is delivered over the Internet from a remote location. The process 700 may be implemented by a content server, such as any one of the content servers 222 illustrated in FIG. 2. As illustrated in FIG. 7, the process 700 begins when a client device 742 requests content 744 from a content provider over the Internet 708. The request is received 752 by the content server. The request typically includes a language preference for the requesting client device 742. For example, the requesting client device 742 may employ Hypertext Transfer Protocol (HTTP) in requesting the content 744. An HTTP formatted request may include the preferred language of the requesting client device's web browser; for example, the HTTP request may include a HTTP_ACCEPT_LANGUAGE tag in the header, indicating a preferred language. The content server may use this information to identify 754 the requesting client device's preferred language. Alternatively or additionally, the content server may identify 754 the client device's preferred language using Javascript code or a cookie or some other method to establish the geographic location and/or time zone in which the requesting client device 742 is located. Alternatively or additionally, the content server may examine the Internet Protocol (IP) address of the requesting client device 742 to identify 754 the geographic location of the requesting client device 742, and from the geographic location extrapolate a preferred language.

Having identified 754 the preferred language of the requesting client device 742, the content server may then select the appropriate content stream and/or content stream components (e.g., the PAT and/or PMT) that match the preferred language. The preferred language may be applied to the audio stream, the closed captioned stream (if requested), or both. This content stream is sent 770 through the Internet 708 back to the requesting client device. 742.

The process 700 of FIG. 7 may also be extended to other media streams, including video streams. Internet protocols that are able to identify preferred video types may be employed. For example, the web browser on the requesting client device 742 may be able to indicate a preferred video type (e.g., a close up view). The content server may be configured to recognize the preferred video type and send a content stream that matches that preference.

It is understood that the above described embodiments are given as examples and not limitations. One skilled in the art will recognized that any and all of the above described embodiments may be combined in a number of different ways.

While various details have been set forth in the foregoing description, it will be appreciated that the various aspects of the systems and methods for gateway conditioned media streaming may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for various aspects of the systems and methods for gateway conditioned media streaming, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

What is claimed is:

1. An apparatus for delivering multimedia content, comprising:
a processor; and
a memory coupled to the processor, wherein the memory stores program instructions, which when executed from the memory cause the processor to:
register one or more client devices, comprising recording a unique identification and multimedia preferences for each device;
receive a request for a content stream from a client device, the content stream comprising media streams that include a multi program transport stream using MPEG including program channels in the stream, each program channel multiplexed into media portions including at least separate video, audio, and closed caption portions;
identify the requesting client device as a registered client device;
modify the requested content stream according to the multimedia preferences for the requesting client device; and
send the modified content stream to the requesting client device,
wherein the content stream program media portions comprises a Program Map Table (PMT) containing an entry for each of the program media portions of each of the media streams,
wherein modifying the content stream program media portions comprises modifying the order of the entries in the PMT by reordering packet IDs (PIDs) for each of the media type program portions with one of the PIDs desired by the user as a first default in the PMT of a combined programming including the program media portions according to the multimedia preferences of the requesting client device for each of the media type program portions, thereby providing an organization of the PIDs for each media type program portion within the combined program, and
wherein modifying the content stream is performed such that the requesting client device comprising a MPEG client receiver can decode and present the content stream with the organization of the PIDs enabling decoding with a complete organization of the PIDs for decoding each media type program portion in the combined program.

2. The apparatus of claim 1, wherein the stored program instructions, when executed by the processor, cause the processor to:
receive a request from the client device to transcode the content stream;
transcode the content stream according to the transcoding request, comprising generating the transcoded content stream according to the multimedia preferences of the requesting client device.

3. The apparatus of claim 2, wherein the stored program instructions, when executed by the processor, cause the processor to generate and save a Program Association Table for each registered client device.

4. The apparatus of claim 2, wherein the stored program instructions, when executed by the processor, cause the processor to generate and save the PMT for each registered client device according to the multimedia preferences for the registered client device.

5. The apparatus of claim 1, wherein the media preference portions further include different views.

6. The apparatus of claim 1, wherein the stored program instructions, when executed by the processor, cause the processor to acquire the content stream from the Internet.

7. The apparatus of claim 1, wherein the stored program instructions, when executed by the processor, cause the processor to acquire the content from a media player.

8. The apparatus of claim 1, wherein the default comprises video, audio and closed captioning in a language in which the media was recorded.

* * * * *